Dec. 24, 1963  D. T. ZENTMYER  3,115,386
PROCESS OF MANUFACTURING FLOOR AND WALL COVERING
Filed Nov. 29, 1960
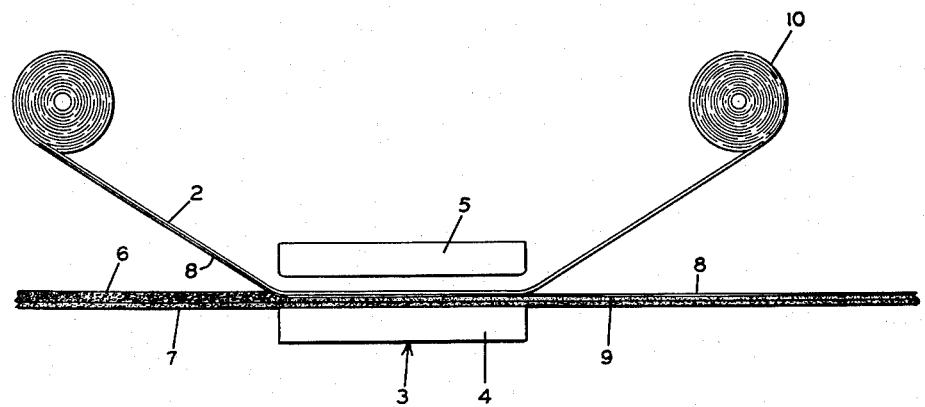
INVENTOR.
DAVID T. ZENTMYER
BY
George L. Herr

# United States Patent Office 3,115,386
Patented Dec. 24, 1963

3,115,386
PROCESS OF MANUFACTURING FLOOR AND WALL COVERING
David T. Zentmyer, Lancaster Township, Lancaster County, Pa., assignor to Armstrong Cork Company, Lancaster, Pa., a corporation of Pennsylvania
Filed Nov. 29, 1960, Ser. No. 72,291
3 Claims. (Cl. 18—59)

This invention relates to a method of applying a protective finish to plastic sheet material such as floor and wall covering, and more particularly to a method whereby the finish is applied to the releasing means employed to prevent adhesion between the plastic mass and the consolidating surface and is transferred from this releasing means to the plastic mass upon the application of heat and pressure.

In the production of plastic floor and wall coverings from granular compositions of the plasticized polyvinyl chloride type, it has been common practice to employ a suitable releasing means to prevent the plastic mass from adhering to the consolidating means when these granular compositions are consolidated into a composite sheet. Because of the high temperature used to fuse the thermoplastic materials during this consolidating step the mass adheres to the pressing surface unless there is interposed between the pressing surface and the plastic mass a suitable releasing means. It has been found that a releasing means comprising a film of a complex compound of the Werner type in which a trivalent nuclear chromium atom is coordinated with an acrylic carboxylic aceto group having at least ten carbon atoms is suitable for carrying out this process. Such material is sold under the trade name "Quilon" and is described and claimed in United States Patent 2,273,040, granted February 17, 1952. The process of employing this material as a press release means is disclosed in United States Patent 2,772,141, granted November 27, 1956. Other releasing means comprising the same properties of Quilon can be satisfactorily employed in carrying out this process. The essential feature is that it permit the escape of the gases generated during the application of heat and pressure while at the same time releasing itself from the pressing surface and from the mass of materials. Other satisfactory releasing coatings are those made from epon resins, alkyl starch and silicone.

The present invention is directed to a method whereby a paper carrier made in accordance with the disclosure of United States Patent 2,772,141, or other comparable paper, is coated with a suitable finishing material for the plastic floor covering. One suitable finishing material, for example, is an emulsion of polyvinyl chloride which is applied to the paper as a uniform coating over the entire surface area of the paper. When this Quilon paper with the applied finish is interposed between the pressing surface and the loose granular mass in such manner that the applied finish is on the side of the paper exposed to the granular mass, and heat and pressure are applied to consolidate the mass, the coating is released from the release paper in the same manner as the vinyl chloride plastic mass, and the material applied to the release paper is fused onto the surface of the plastic mass, resulting in a surface which protects the sheet material against wear, staining, etc.

An object of this invention is to provide a means whereby a protective surface can be placed on plastic floor covering by transferring the material forming such protective surface from the releasing means interposed between the plastic mass and the consolidating means at the time the material is formed.

In carrying out this invention the plastic material comprising granules of filled or unfilled polyvinyl chloride or a copolymer of vinyl chloride and vinyl acetate is placed on a suitable carrier to form the backing for the finished material. This layer of granular plastic material may be formed of colors laid up in a predetermined design so that upon final consolidation the sheet will have this characteristic design. In order to prevent the thermoplastic material from adhering to the hot consolidating surface, it has been common practice to interpose a film between the consolidating surface and the plastic mass to release the plastic mass from the consolidating surface after the mass has been consolidated into a composite sheet. To this releasing layer there is previously applied a coating of a material to serve as the finished protective surface of the sheet material. This protective surface may be in the form of an emulsion of polyvinyl chloride or any other suitable material. The material may be applied to the release paper in any of the conventional methods such as a regular roll coater, reverse roll coater, spray nozzle, doctor blade, etc. The coating is dried and when placed in position on top of the loose granular mass and urged into engagement therewith by means of heat and pressure, the coating is released from the paper and fuses onto the surface of the plastic mass.

The following examples will more clearly set forth the invention here involved.

*Example 1*

A mass of granular thermoplastic material was placed on a backing or carrier made of rubber and asbestos. The granular layer was of sufficient thickness to yield a final consolidated sheet of the desired gauge. The granules of thermoplastic material were of a size that would pass through a 10-mesh screen but were retained on a 50-mesh screen. The thermoplastic material was of the following formulation:

| | Parts by weight |
|---|---|
| Copolymer comprising 96.5% vinyl chloride and 3.5% vinyl acetate | 250 |
| Butyl benzyl phthalate (plasticizer for the resin) | 50 |
| Epoxy plasticizer | 10 |
| Barium cadmium stearate (stabilizer for the resin) | 7 |
| Limestone filler and pigment | 453 |
| | 770 |

This mass of plastic granules disposed on the backing was heated to a temperature close to the fusion temperature of the resin, and while at this temperature it was passed into a consolidating press maintained at a temperature of approximately 350° F. The face of the press to which the granules were exposed was covered with a layer of release paper having applied thereto a film of material selected to release the thermoplastic material from the face of the press. This film comprised a complex compound of the Werner type in which the trivalent nuclear chromium atom is coordinated with an acrylic carboxylic aceto group having at least ten carbon atoms. To the surface of the release paper carrying the above releasing film there was also applied by means of a suitable doctoring device a film of a protective coating for the consolidated sheet. The composition of this protective coating was as follows:

| | Percent |
|---|---|
| Copolymer of vinyl chloride and vinyl acetate | 14 |
| Dioctyl phthalate plasticizer | 2 |
| Methyl ethyl ketone | 38 |
| Toluene | 38 |
| Cyclohexanone | 8 |
| | 100 |

The press was closed with the protective coating carried by the release paper in engagement with the top surface of the layer of granular composition disposed on the backing resting on the bed of the press. The press was subjected to sufficient pressure for a period of time sufficient to consolidate the loose granular mass into a composite mass.

Upon removal of this consolidated sheet from the press the paper was released from the surface of the finished consolidated mass. The protective coating which had transferred from the surface of the release paper to the surface of the composite sheet was found to be satisfactory from the standpoint of gloss, coverage, smoothness, durability, etc.

*Example 2*

The same granular composition on the same backing was placed in the same press with the same type release paper but with a protective coating applied thereto of the following formulation:

| | Percent |
|---|---|
| Acryloid A–101 (40% acrylic solids in methyl ethyl ketone) | 62 |
| Toluene | 38 |
| | 100 |

The results of this test were also satisfactory.

*Example 3*

The same granular composition on the same backing was placed in the same press with the same type release paper but with a protective coating applied thereto of the following formulation:

| | Percent |
|---|---|
| Polyvinyl butyral latex (50% solids) | 100 |

Here again the results were satisfactory.

*Example 4*

The same granular composition on the same backing was placed in the same press with the same type release paper but with a protective coating applied thereto of the following formulation:

| | Percent |
|---|---|
| Resyn 2203 (43%) (polyvinyl acetate/acrylic copolymer) | 50 |
| Water | 45 |
| Triton X–100 (wetting agent, iso-octyl phenyl polyethoxy ethanol) | 5 |
| | 100 |

The results of this formulation were satisfactory.

*Example 5*

The same granular composition on the same backing was placed in the same press with the same type release paper but with a protective coating applied thereto of the following formulation:

| | Percent |
|---|---|
| Polyvinylidene chloride latex (50%) | 100 |

Here again the results were satisfactory.

*Example 6*

The same granular composition on the same backing was placed in the same press with the same type release paper but with a protective coating applied thereto of the following formulation:

| | Percent |
|---|---|
| Rhoplex B–60–A (45%) (copolymer of ethyl acrylate and methyl methacrylate) | 24 |
| Rhoplex B–85 (38%) (methyl methacrylate) | 24 |
| Water | 35 |
| Triton X–100 (wetting agent) | 5 |
| Hydroxyethylcellulose solution (2%) (thickener) | 12 |
| | 100 |

These results were satisfactory.

*Example 7*

The same granular composition on the same backing was placed in the same press with the same type release paper but with a protective coating applied thereto of the following formulation:

| | Percent |
|---|---|
| Half-second butyrate | 21 |
| Dimethyl phthalate | 8 |
| Toluene | 24 |
| Ethyl alcohol | 10 |
| 2-ethylhexyl acetate | 10 |
| Alipal CO 436 (an ammonium salt of sulfate ester of an alkylphenoxy polyoxyethylene ethanol) | 1 |
| Igepal CO 630 (nonyl phenoxy polyoxyethylene ethanol) | 1 |
| Water | 25 |
| | 100 |

These results were satisfactory.

The method disclosed herein makes it possible to employ coatings which are much tougher and have a much higher molecular weight because they can be transferred onto the wearing surface by means of the pressure of the consolidating device and therefore do not carry with them the limitations of the conventional coating which must be applied by the devices which are used currently in placing protective films on sheet material of this type after consolidation.

In the drawing there is shown a roll of coated release paper 2 positioned above and to the right of the flat bed press 3 having a bottom platen 4 and a top or movable platen 5. The loose granular material 6 moves into the press on a carrier or backing 7. When the press is closed and the release paper 2 is urged into engagement with the granular material, the heat and pressure transfer the coating 8 from the surface of the paper 2 and fuse the coating 8 onto the surface of the consolidated material 9 at the same time the granular material 6 is being consolidated into a homogeneous mass 9 on the backing. The paper, after the coating 8 has been removed, is wound onto the roll 10.

This method can be carried out on any of the conventional types of consolidating devices such as roll consolidators, flat bed presses, and other means used in the production of sheet material. If desired, the factory finish may be applied by spraying the emulsion directly onto the surface of the granules before they enter the consolidator and using the release paper to release the coating from the press platen. The preferred manner, however, is the one in which the coating is previously applied to the release paper and transferred from the release paper onto the plastic sheet material in the consolidating press.

I claim:

1. In a method of forming a vinyl plastic sheet from a plurality of particles of vinyl composition on a press, the steps comprising providing between the surface of said particles and a pressing surface a release layer having applied thereto a coating of the dried residue of a resinous composition, consolidating said vinyl particles into a sheet by the application of heat and pressure thereto through the release layer and transferring the resinous coating from said release layer and fusing it onto the surface of said consolidated plastic sheet, discontinuing the application of pressure, and releasing said consolidated vinyl sheet from said pressing surface.

2. In a method of forming a vinyl plastic sheet from a plurality of particles of vinyl composition on a press, the steps comprising providing between the surface of said particles and a pressing surface a release layer having applied thereto a coating comprising the dried residue of an emulsion of a copolymer of vinyl chloride and vinyl acetate, with said coating of vinyl chloride and vinyl acetate lying in direct engagement with said vinyl particles, consolidating said vinyl particles into a sheet by the application of heat and pressure thereto through the release layer and transferring the coating from said release layer and fusing it onto the surface of said consolidated plastic sheet, discontinuing the application of pressure, and releasing said consolidated vinyl sheet from said pressing surface.

3. In a method of forming a vinyl plastic sheet from a plurality of particles of vinyl composition on a press, the steps comprising providing between the surface of said particles and a pressing surface a release layer of a complex compound of the Werner type in which a trivalent nuclear chromium atom is coordinated with an acrylic carboxylic aceto group having at least ten carbon atoms and having applied thereto a coating comprising the dried residue of an emulsion of a copolymer of vinyl chloride and vinyl acetate, with said coating of vinyl chloride and vinyl acetate lying in direct engagement with said particles, consolidating said vinyl particles into a sheet by the application of heat and pressure thereto through the release layer and transferring the coating from said release layer and fusing it onto the surface of said consolidated plastic sheet, discontinuing the application of pressure, and releasing said consolidated vinyl sheet from said pressing surface.

References Cited in the file of this patent

UNITED STATES PATENTS

| | | |
|---|---|---|
| 1,259,327 | Wiederhold | Mar. 12, 1918 |
| 2,673,370 | Goss | Mar. 30, 1954 |
| 2,739,919 | Artzt | Mar. 27, 1956 |
| 2,772,141 | Dunlap | Nov. 27, 1956 |
| 2,813,052 | Lancaster | Nov. 12, 1957 |
| 2,867,263 | Bartlett | Jan. 6, 1959 |
| 2,913,773 | Hassel | Nov. 24, 1959 |